(12) United States Patent
Kimura

(10) Patent No.: US 9,131,533 B2
(45) Date of Patent: Sep. 8, 2015

(54) COMMUNICATION-PATH CONTROL PROGRAM AND INFORMATION PROCESSING APPARATUS

(71) Applicant: FUJITSU LIMITED, Kawasaki-shi (JP)

(72) Inventor: Masatoshi Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 13/864,649

(22) Filed: Apr. 17, 2013

(65) Prior Publication Data

US 2013/0294430 A1    Nov. 7, 2013

(30) Foreign Application Priority Data

May 7, 2012   (JP) .................................. 2012-105962

(51) Int. Cl.
| | | |
|---|---|---|
| H04W 92/10 | (2009.01) | |
| H04W 84/12 | (2009.01) | |
| G06F 17/30 | (2006.01) | |
| H04L 29/08 | (2006.01) | |
| H04M 1/725 | (2006.01) | |

(52) U.S. Cl.
CPC ......... *H04W 84/12* (2013.01); *G06F 17/30887* (2013.01); *H04L 67/02* (2013.01); *H04M 1/72561* (2013.01); *H04M 2250/14* (2013.01)

(58) Field of Classification Search
None
See application file for complete search history.

(56) References Cited

U.S. PATENT DOCUMENTS

| | | | |
|---|---|---|---|
| 2009/0285189 A1 | 11/2009 | Kim et al. | |
| 2010/0251390 A1* | 9/2010 | Shimura et al. | ................. 726/30 |
| 2010/0283582 A1* | 11/2010 | Fujita et al. | ................. 340/7.37 |
| 2011/0025858 A1* | 2/2011 | Elazar et al. | ............... 348/207.1 |
| 2011/0066777 A1* | 3/2011 | Della Pia et al. | ............. 710/106 |
| 2012/0163735 A1* | 6/2012 | Kiyoshige | .................... 382/305 |

FOREIGN PATENT DOCUMENTS

KR      10-0694298 B1    3/2007

OTHER PUBLICATIONS

Stapa Saito, "Weekly Stapatronics mobile" Musen LAN de shashin tenso!! na SD card, Jan. 5, 2009, Search Date: Apr. 24, 2012, <URL:http://k-tai.impress.co.ip/cda/articie/stapa/43417.html> (partial English translation).
Stapa Saito, "Weekly stapatronics mobile" Eye-Fi X2 ni direct mode ga kita!!, Apr. 25, 2011, Search Date: Apr. 24, 2012, <UR:http://k-tai.imoress.co.jp/docs/column/stapa/20110425_442155.html> (partial English translation).
KROA—Office Action of Korean Patent Application No. 10-2013-47310 mailed Oct. 15, 2014.

* cited by examiner

*Primary Examiner* — Duc Duong
(74) *Attorney, Agent, or Firm* — Fujitsu Patent Center

(57)           ABSTRACT

A computer-readable recording medium has stored therein a communication-path control program causing a computer to execute a process which includes detecting a device capable of wireless communication out of a connecting device to be a destination of wireless communication to connect to a network and a storage medium that performs wireless communication; when having detected the connecting device, connecting to the connecting device; when having detected the storage medium in a state where the computer is connected to the connecting device, determining whether a certain application is running on the computer; and when the certain application is not running, disconnecting from the connecting device and connecting to the storage medium.

7 Claims, 7 Drawing Sheets

COMMUNICATION-PATH CONTROL PROGRAM AND INFORMATION PROCESSING APPARATUS

CROSS-REFERENCE TO RELATED APPLICATION

This application is based upon and claims the benefit of priority of the prior Japanese Patent Application No. 2012-105962, filed on May 7, 2012, the entire contents of which are incorporated herein by reference.

1. Field

The embodiments discussed herein are directed to a communication-path control program and an information processing apparatus.

2. Background

Various memory cards, such as a USB (Universal Serial Bus) flash drive and an SD memory card (registered trademark), have been provided as a recording medium for storing data of images or moving images, etc. taken with a digital camera or the like. Such memory cards are small in storage capacity, so the memory cards are generally used as a temporary storage location in such a way that data stored in a memory card is moved to a personal computer (PC) on an as needed basis to erase old data.

Furthermore, in recent years, memory cards with a wireless communication function have been provided. A memory card with the wireless communication function can establish wireless communication with a PC even when the memory card has been inserted into an image pickup apparatus such as a digital camera, i.e., even if the memory card is not directly connected to the PC, and the PC can retrieve data from the memory card via wireless communication.

Non-patent document 1: Stapa Saito, Stapa Saito's "Weekly Stapatronics mobile" Musen LAN de shashin tenso!! na SD card, [online], K-tai Watch, 5 Jan. 2009, [search on 24 April, H24], Internet <URL: http://k-tai.impress.co.jp/cda/article/stapa/43417.html>

Non-patent document 2: Stapa Saito, Stapa Saito's "Weekly Stapatronics mobile" Eye-Fi X2 ni direct mode ga kita!!, [online], K-tai Watch, 25 Apr. 2011, [search on 24 April, H24], Internet <URL: http://k-tai.impress.co.jp/docs/column/stapa/20110425_442155.html>

However, depending on settings of PCs, some PCs have a function of automatically switching the connection to a detected memory card when having detected the memory card as a device capable of wireless communication. In such setting, when a PC has detected a memory card as a device capable of wireless communication in a state where the PC is connected to an access point to connect to a network, the access point may be automatically switched to the memory card. In this case, for example, even when a user of the PC is browsing a site on the Internet using the PC, the user becomes unable to browse the site due to the detection of the memory card. Under such circumstances, the continuity of communication connection cannot be maintained, and it is difficult to provide a service that the user wants.

SUMMARY

According to an aspect of an embodiment, a computer-readable recording medium has stored therein a communication-path control program causing a computer to execute a process which includes detecting a device capable of wireless communication out of a connecting device to be a destination of wireless communication to connect to a network and a storage medium that performs wireless communication; when having detected the connecting device, connecting to the connecting device; when having detected the storage medium in a state where the computer is connected to the connecting device, determining whether a certain application is running on the computer; and when no certain application is running, disconnecting from the connecting device and connecting to the storage medium.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of the present invention will be explained with reference to accompanying drawings. Incidentally, the communication-path control program and information processing apparatus according to the present invention are not limited to the embodiments described below.

[a] First Embodiment

Figure 1:
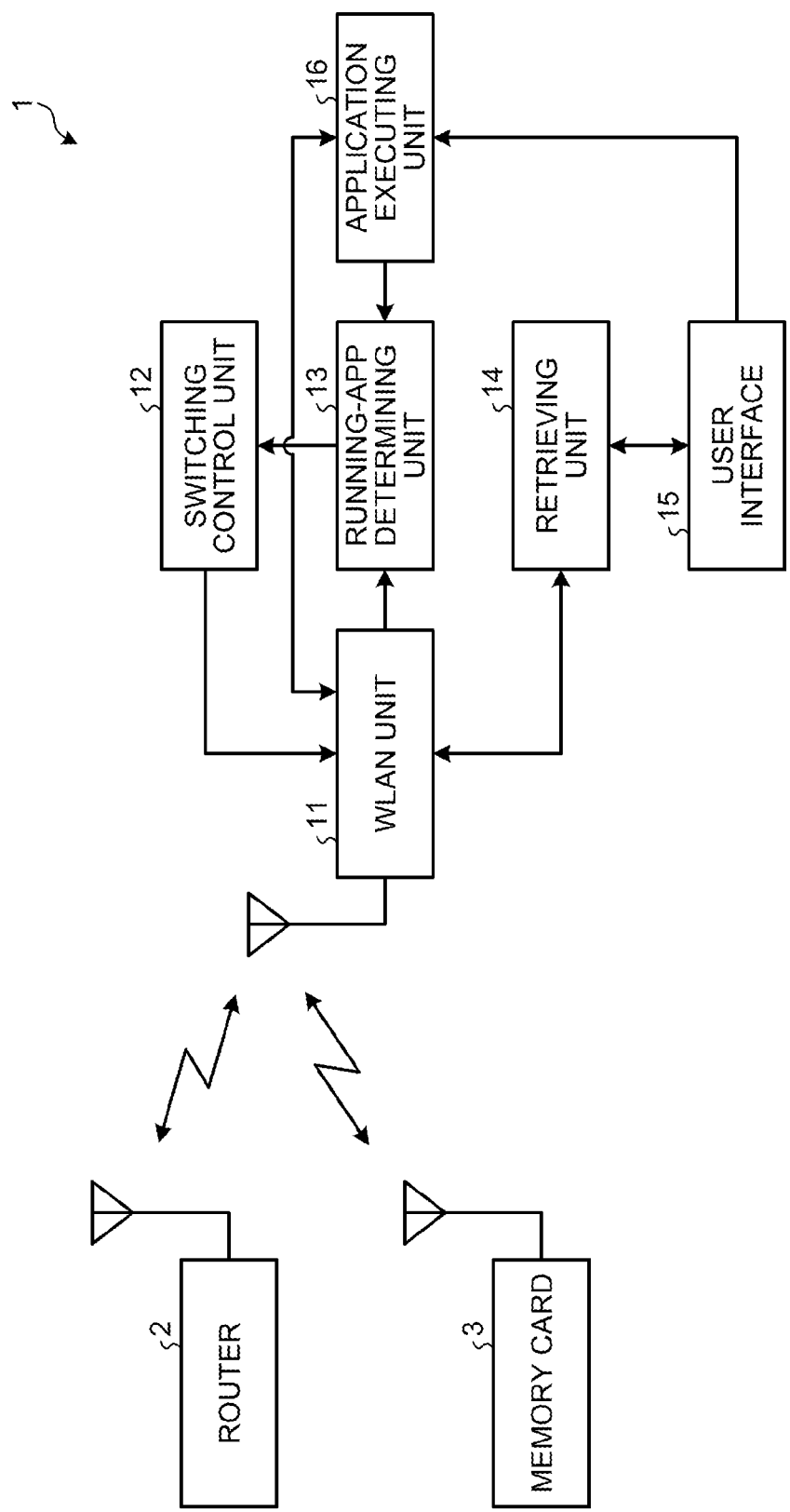
FIG. 1 is a block diagram of an information processing apparatus according to a first embodiment.

FIG. 1 is a block diagram of an information processing apparatus according to a first embodiment. In the present embodiment, a personal computer (PC) is described as an example of the information processing apparatus. A PC 1 performs wireless communication using a router 2, a memory card 3, and a wireless local area network (LAN). The wireless LAN is, for example, a Wi-Fi (Wireless Fidelity) (registered trademark) or the like. In FIG. 1, only the router 2 and the memory card 3 are depicted as examples of a destination of wireless LAN communication that the PC establishes; however, there can be multiple routers, or there can be other devices with a wireless LAN communication function.

The router 2 is a device having a function of an access point (AP) of the wireless LAN installed in home of an operator of the PC 1. The wireless LAN AP function is a function of relaying communication between devices via a wireless LAN. The router 2 establishes communication with the PC 1 having a station (STA) function via the wireless LAN. The wireless LAN STA function is a function of communicating with another device via an access point via a wireless LAN. In the present embodiment, there is described a home wireless LAN environment as an example; however, a wireless LAN environment is not limited to this, and can be a company's wireless LAN environment or a public wireless network. The router 2 is connected to the Internet. The router 2 transmits data received from the PC 1 to the Internet, and also transmits data sent via the Internet to the PC 1.

The memory card 3 is a storage medium with a wireless LAN AP function. The memory card 3 is, for example, an SD memory card or the like. The memory card 3 is inserted into a card insertion slot of a device, such as a camera or a PC, and is connected to the device, thereby being supplied with electric power and operating with the electric power supplied from the device. The memory card 3 stores therein various contents, such as images or moving images, etc. taken by a camera. Furthermore, the memory card 3 establishes communication with the PC 1 having the STA function via the wireless LAN. Specifically, in response to a request from the PC 1, the memory card 3 transmits content stored therein to the PC 1 via the wireless LAN. In FIG. 1, for the convenience of explanation, only the memory card 3 is depicted; actually, the memory card 3 has been inserted into a device, such as a camera, and supplied with electric power.

The PC 1 includes a wireless LAN (WLAN) unit 11, a switching control unit 12, a running-app determining unit 13, a retrieving unit 14, a user interface 15, and an application executing unit 16.

The WLAN unit 11 has stored therein a service set identifier (SSID) of a device having a wireless LAN function registered by the operator. In the present embodiment, the router 2 and the memory card 3 have been registered in the WLAN unit 11 in advance. Then, the WLAN unit 11 detects a device which has a registered SSID and is in a state capable of wireless communication. A device being in a state capable of wireless communication here means a device existing in a wireless communication area of the PC 1. In the present embodiment, when the router 2 or the memory card 3 exists in the wireless communication area of the PC 1, the WLAN unit 11 detects the device.

When the WLAN unit 11 has detected the router 2 in a state where a connection with the memory card 3 is not established, the PC 1 establishes a connection using the WLAN unit 11 as a station and the router 2 as an access point.

Furthermore, when the WLAN unit 11 has detected the memory card 3 in a state where a connection with the router 2 is not established, the PC 1 establishes a connection using the WLAN unit 11 as a station and the memory card 3 as an access point.

On the other hand, when the WLAN unit 11 has detected the memory card 3 in a state where a connection with the router 2 is established, the WLAN unit 11 notifies the running-app determining unit 13 of the detection of the memory card 3 in a where the WLAN unit 11 is connected to the router 2. After that, when the WLAN unit 11 is controlled to disconnect from the router 2 and connect to the memory card 3 by the switching control unit 12, the WLAN unit 11 disconnects from the router 2 and then establishes a connection using the WLAN unit 11 as a station and the memory card 3 as an access point. Furthermore, when having received a notification that the switching is impossible from the switching control unit 12, the WLAN unit 11 does not perform switching of the connection to the memory card 3, and continues the connection with the router 2.

When the WLAN unit 11 is connected to the router 2, the WLAN unit 11 transmits data sent from the application executing unit 16 to the router 2. Furthermore, the WLAN unit 11 transmits data received from the router 2 to the application executing unit 16.

When the WLAN unit 11 is connected to the memory card 3, upon receipt of a request for content retrieval from the retrieving unit 14, the WLAN unit 11 transmits content sent from the memory card 3 to the retrieving unit 14. This WLAN unit 11 corresponds to an example of a "communication unit".

The application executing unit 16 responds to an operator's instruction input through the user interface 15, and executes a specified application that performs a process by connecting to the Internet, such as Internet browsing software or Internet video browsing software. Hereinafter, an application that performs a process by connecting to the Internet is referred to as an "Internet-using application". Then, in response to a request from the running application, the application executing unit 16 performs data transmission with the WLAN unit 11. Furthermore, the application executing unit 16 can run an application that performs a process by connecting to the Internet.

The running-app determining unit 13 receives a notification of detection of the memory card 3 in a state where the WLAN unit 11 is connected to the router 2 from the WLAN unit 11. Then, the running-app determining unit 13 determines whether the application executing unit 16 is executing an Internet-using application. When the application executing unit 16 is executing an Internet-using application, the running-app determining unit 13 transmits a notification that the Internet-using application is running to the switching control unit 12. On the other hand, when the application executing unit 16 is not executing an Internet-using application, the running-app determining unit 13 transmits a notification that the switching is possible to the switching control unit 12. In the present embodiment, there is described a case where as long as an application is an Internet-using application, the switching of the connection to the memory card 3 is not performed; however, conditions are not limited to this. For example, when the application executing unit 16 has accepted the registration of a particular application out of Internet-using applications in advance and is executing the registered particular application, the running-app determining unit 13 can disapprove the switching. Furthermore, when the application executing unit 16 has accepted the registration of another application including but not limited to an Internet-using application and is executing the registered application, the running-app determining unit 13 can disapprove the switching. This running-app determining unit 13 corresponds to an example of a "determining unit".

When the switching control unit 12 has received a notification that an Internet-using application is running from the running-app determining unit 13, the switching control unit 12 transmits a notification that the switching is impossible to the WLAN unit 11. On the other hand, when having received a notification that the switching is impossible from the running-app determining unit 13, the switching control unit 12 controls the WLAN unit 11 to disconnect from the router 2 and connect to the memory card 3. This switching control unit 12 corresponds to an example of a "control unit".

The retrieving unit 14 transmits a request for content retrieval to the WLAN unit 11 in a state where the WLAN unit 11 is connected to the memory card 3. Specifically, in a case where automatic retrieval has been set, upon establishment of the connection between the WLAN unit 11 and the memory card 3, the retrieving unit 14 automatically transmits a request for content retrieval to the WLAN unit 11. Furthermore, in a case where manual retrieval has been set, after establishment of the connection between the WLAN unit 11 and the memory card 3, upon receipt of an instruction to retrieve content made by the operator through the user interface 15, the retrieving unit 14 transmits a request for content retrieval to the WLAN unit 11. Then, the retrieving unit 14 acquires content that the WLAN unit 11 has received from the memory card 3, and stores the acquired content in a storage device that the retrieving unit 14 includes. In the present embodiment, there is described a case where the retrieving unit 14 includes a storage device; however, the storage device can be provided separately from the retrieving unit 14.

Figure 2:
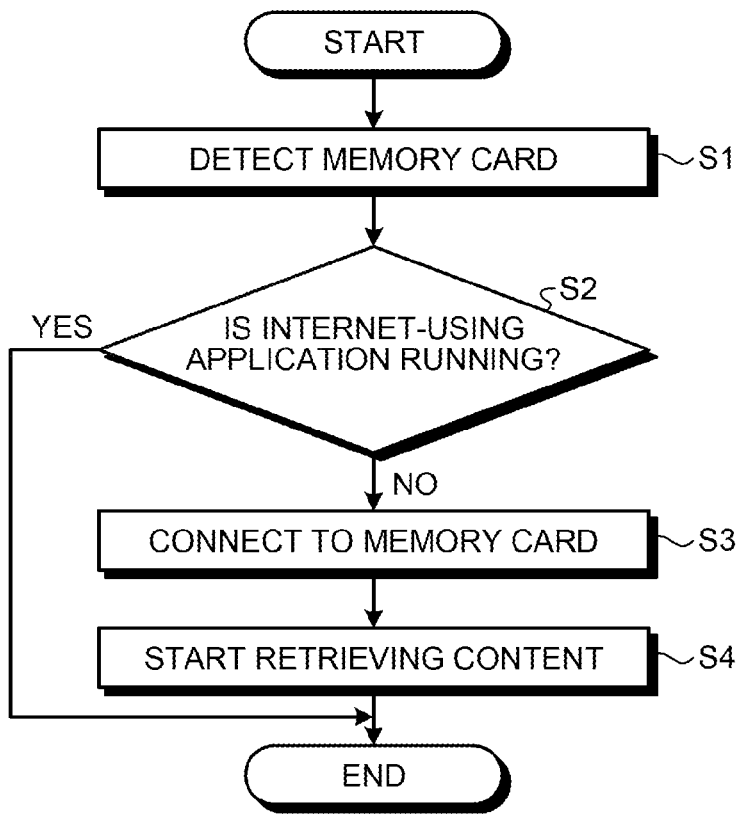
FIG. 2 is a flowchart of an access-point selecting process performed by a PC according to the first embodiment upon detection of a memory card.

Subsequently, the flow of an access-point selecting process performed by the PC 1 according to the present embodiment upon detection of a memory card is explained with reference to FIG. 2. FIG. 2 is a flowchart of the access-point selecting process performed by the PC according to the first embodiment upon detection of the memory card. A communication control program stored in the PC 1 causes, for example, a central processing unit (CPU) or the like of the PC 1 to execute processes in the flowchart illustrated in FIG. 2. This flowchart is based on the premise that the memory card 3 and the router 2 have already been registered in the PC 1. Furthermore, it is based on the premise that prior to this flowchart, the WLAN unit 11 is connected to the router 2 and maintains this state.

The WLAN unit 11 detects the memory card 3 (Step S1). The WLAN unit 11 notifies the running-app determining unit 13 of the detection of the memory card 3 in a state where the WLAN unit 11 is connected to the router 2.

The running-app determining unit 13 receives the notification of the detection of the memory card 3 in the state where the WLAN unit 11 is connected to the router 2 from the WLAN unit 11. Then, the running-app determining unit 13 determines whether the application executing unit 16 is executing any Internet-using application (Step S2). When an Internet-using application is running (YES at Step S2), the WLAN unit 11 terminates the switching of the connection to the memory card 3.

On the other hand, when no Internet-using application is running (NO at Step S2), the running-app determining unit 13 sends a notification that the switching is possible to the switching control unit 12. When having received the notification that the switching is possible from the running-app determining unit 13, the switching control unit 12 controls the WLAN unit 11 to disconnect from the router 2 and connect to the memory card 3. Responding to the control by the switching control unit 12, the WLAN unit 11 disconnects from the router 2 and then connects to the memory card 3 (Step S3).

When the connection between the WLAN unit 11 and the memory card 3 has been established, the retrieving unit 14 transmits a request for content retrieval to the WLAN unit 11, and starts retrieving content stored in the memory card 3 (Step S4).

As described above, upon detection of a memory card, when an application that performs a process by connecting to the Internet is running, the information processing apparatus according to the present embodiment does not perform the switching to the memory card and continues the connection to the Internet. Consequently, even when a memory card has been detected, the connection to the Internet can be maintained, and the process using the Internet can be continued.

[b] Second Embodiment

Figure 3:
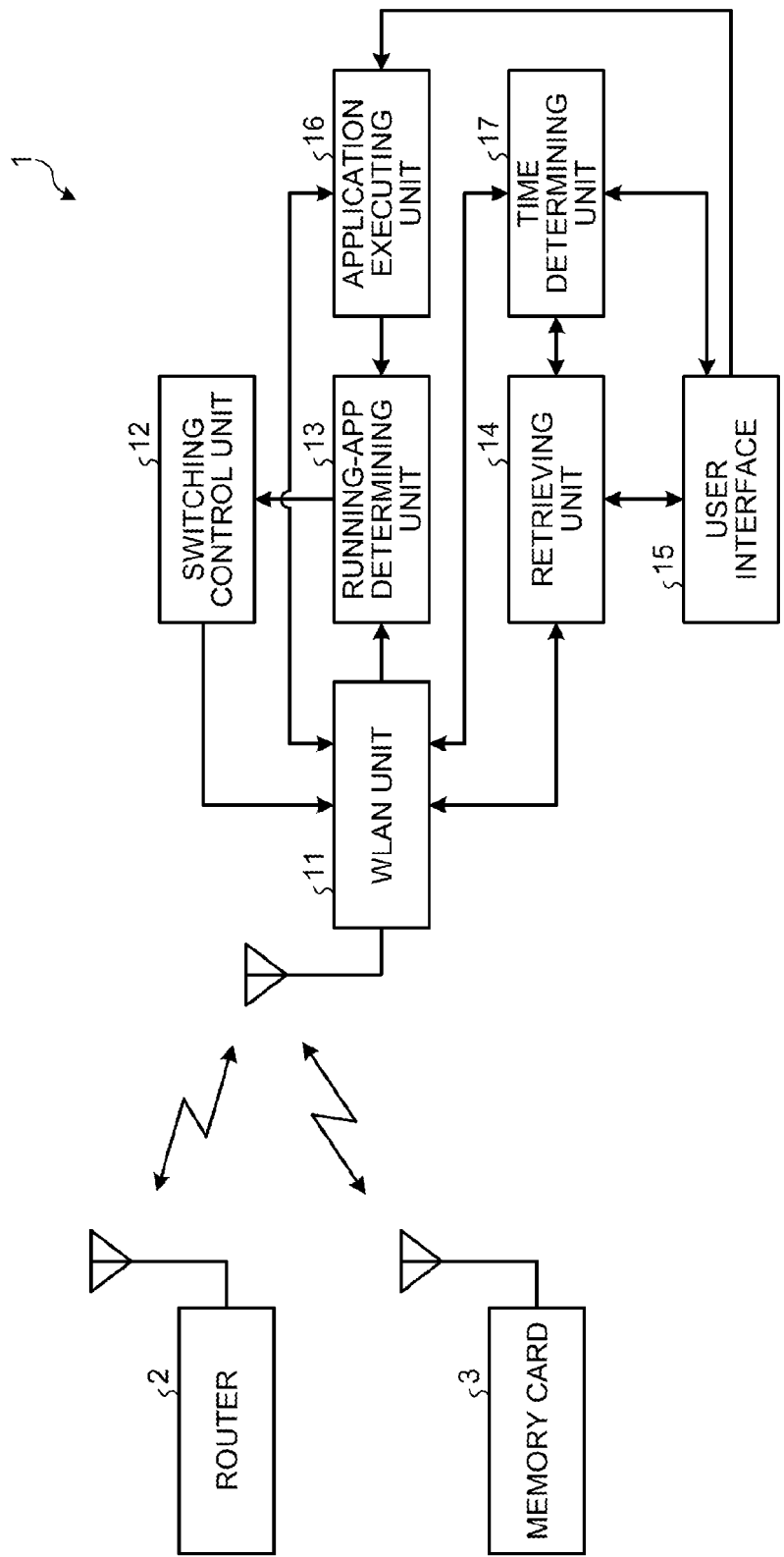
FIG. 3 is a block diagram of an information processing apparatus according to a second embodiment.

FIG. 3 is a block diagram of an information processing apparatus according to a second embodiment. The information processing apparatus according to the present embodiment differs from that of the first embodiment in that even when a memory card has been detected, if a certain period of time has not elapsed since the last time content was retrieved from the memory card, the information processing apparatus does not connect to the memory card. As illustrated in FIG. 3, a PC 1 according to the present embodiment has a configuration that a time determining unit 17 is further added to the PC according to the first embodiment. In FIG. 3, a unit having the same reference numeral as in FIG. 1 has the same function unless otherwise stated.

When having detected the memory card 3, the WLAN unit 11 notifies the time determining unit 17 of the detection of the memory card 3. After that, when having received a notification of permission of connection from the time determining unit 17, the WLAN unit 11 determines whether the connection with the router 2 has been established. On the other hand, when having received a notification of non-permission of connection from the time determining unit 17, the WLAN unit 11 does not perform the switching of the connection to the memory card 3, and continues the connection with the router 2.

When the connection with the router 2 has not been established, a connection using the WLAN unit 11 as a station and the memory card 3 as an access point is established.

On the other hand, when the connection with the router 2 has been established, the WLAN unit 11 notifies the running-app determining unit 13 of the detection of the memory card 3 in a state where the WLAN unit 11 is connected to the router 2. After that, when the WLAN unit 11 is controlled to disconnect from the router 2 and connect to the memory card 3 by the switching control unit 12, the WLAN unit 11 disconnects from the router 2 and then establishes a connection using the WLAN unit 11 as a station and the memory card 3 as an access point. Furthermore, when having received a notification that the switching is impossible from the switching control unit 12, the WLAN unit 11 does not perform the switching of the connection to the memory card 3 and continues the connection with the router 2.

The retrieving unit 14 retrieves content from the memory card 3, and then notifies the time determining unit 17 of the last retrieval time which is the time at which the retrieving unit 14 last retrieved the content from the memory card 3.

The time determining unit 17 has stored therein a time threshold used to determine whether a connection to the memory card 3 is possible or not in advance. The time threshold is, for example, 12 hours. It is preferable that the time threshold is determined according to the usage of the memory card 3. For example, when contents stored in the memory card 3 are often updated, it is preferable to shorten the time threshold; when the contents are not often updated, it is preferable to lengthen the time threshold.

The time determining unit 17 includes a timer. The time determining unit 17 receives a notification of the last retrieval time from the retrieving unit 14. Then, using the timer, the time determining unit 17 measures an elapsed time since the last retrieval time of the memory card 3.

After that, the time determining unit 17 receives a notification of detection of the memory card 3 from the WLAN unit 11. Then, the time determining unit 17 determines whether an elapsed time since the last retrieval time of the memory card 3 at the time exceeds the time threshold.

When the elapsed time since the last retrieval time of the memory card 3 exceeds the time threshold, the time determining unit 17 transmits a notification of permission of connection to the WLAN unit 11.

On the other hand, when the elapsed time since the last retrieval time of the memory card 3 does not exceed the time threshold, the time determining unit 17 displays a screen to make the operator choose whether or not to connect to the memory card 3 on the user interface 15. Then, the time determining unit 17 receives the operator input indicating whether a connection to the memory card 3 is necessary or not made through the user interface 15. When having received an instruction to connect to the memory card 3 from the operator, the time determining unit 17 transmits a notification of permission of connection to the WLAN unit 11. On the other hand, when having received a notification of rejection of a connection to the memory card 3 from the operator, the time determining unit 17 transmits a notification of non-permission of connection to the WLAN unit 11. In the present embodiment, to reflect an operator's opinion, when an elapsed time since the last retrieval time does not exceed the time threshold, it is configured to make the operator choose whether a connection to the memory card 3 is necessary or not; however, it is not limited to this, and the time determining unit 17 can be configured to determine non-permission of connection without displaying the selection screen to choose whether connection is necessary or not.

Figure 4:
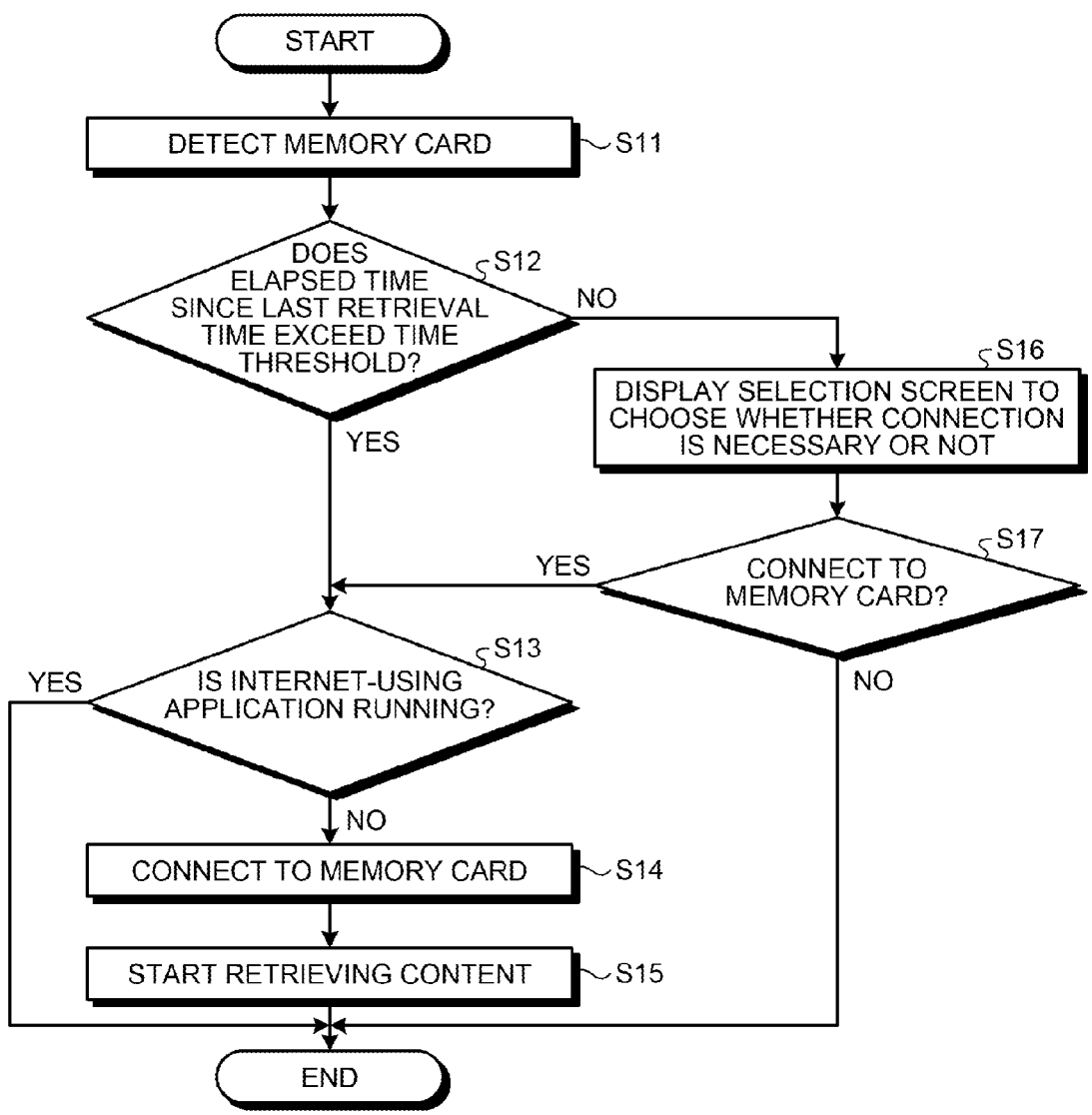
FIG. 4 is a flowchart of an access-point selecting process performed by a PC according to the second embodiment upon detection of a memory card.

Subsequently, the flow of an access-point selecting process performed by the PC according to the present embodiment upon detection of a memory card is explained with reference to FIG. 4. FIG. 4 is a flowchart of the access-point selecting process performed by the PC according to the second embodiment upon detection of the memory card. A communication control program stored in the PC 1 causes, for example, a CPU or the like of the PC 1 to execute processes in the flowchart illustrated in FIG. 4. This flowchart is based on the premise that the memory card 3 and the router 2 have already been registered in the PC 1. Furthermore, it is based on the premise that prior to this flowchart, the WLAN unit 11 is connected to the router 2 and maintains this state.

The WLAN unit 11 detects the memory card 3 (Step S11). The WLAN unit 11 notifies the time determining unit 17 of the detection of the memory card 3.

When having received the notification of the detection of the memory card 3 from the WLAN unit 11, the time determining unit 17 determines whether an elapsed time since the last retrieval time of the memory card 3 exceeds the time threshold (Step S12).

When the elapsed time since the last retrieval time of the memory card 3 exceeds the time threshold (YES at Step S12), the WLAN unit 11 notifies the running-app determining unit 13 of the detection of the memory card 3 in a state where the WLAN unit 11 is connected to the router 2. The running-app determining unit 13 receives the notification of the detection of the memory card 3 in the state where the WLAN unit 11 is connected to the router 2 from the WLAN unit 11. Then, the running-app determining unit 13 determines whether the application executing unit 16 is executing any Internet-using application (Step S13). When an Internet-using application is running (YES at Step S13), the WLAN unit 11 terminates the switching of the connection to the memory card 3.

On the other hand, when no Internet-using application is running (NO at Step S13), the running-app determining unit 13 sends a notification that the switching is possible to the switching control unit 12. When having received the notification that the switching is possible from the running-app determining unit 13, the switching control unit 12 controls the WLAN unit 11 to disconnect from the router 2 and connect to the memory card 3. Responding to the control by the switching control unit 12, the WLAN unit 11 disconnects from the router 2 and then connects to the memory card 3 (Step S14).

When the connection between the WLAN unit 11 and the memory card 3 has been established, the retrieving unit 14 transmits a request for content retrieval to the WLAN unit 11, and starts retrieving content stored in the memory card 3 (Step S15).

On the other hand, when the elapsed time since the last retrieval time of the memory card 3 does not exceed the time threshold (NO at Step S12), the time determining unit 17 displays the selection screen to make the operator choose whether a connection to the memory card 3 is necessary or not on the user interface 15 (Step S16).

Then, the time determining unit 17 determines whether an operator's instruction input through the selection screen is to connect to the memory card 3 (Step S17). When having been instructed to connect to the memory card 3 (YES at Step S17), the time determining unit 17 notifies the WLAN unit 11 of permission of a connection to the memory card 3, and returns the process to Step S13. On the other hand, when a connection to the memory card 3 is not permitted (NO at Step S17), the WLAN unit 11 terminates the switching of the connection to the memory card 3.

As described above, upon detection of a memory card, if a certain period of time has not elapsed since the last time content was retrieved from the memory card, the information processing apparatus according to the present embodiment does not perform the switching to the memory card and continues the connection to the Internet. This is because the time threshold is determined according to an operation status of the memory card, so if the elapsed time does not exceed the time threshold, it is highly possible that contents stored in the memory card are not yet updated, and it is thought that there is no need to retrieve content. Consequently, the unnecessary switching upon detection of the memory card can be further suppressed, and the maintenance of connection to the Internet can be further improved.

[c] Third Embodiment

Figure 5:
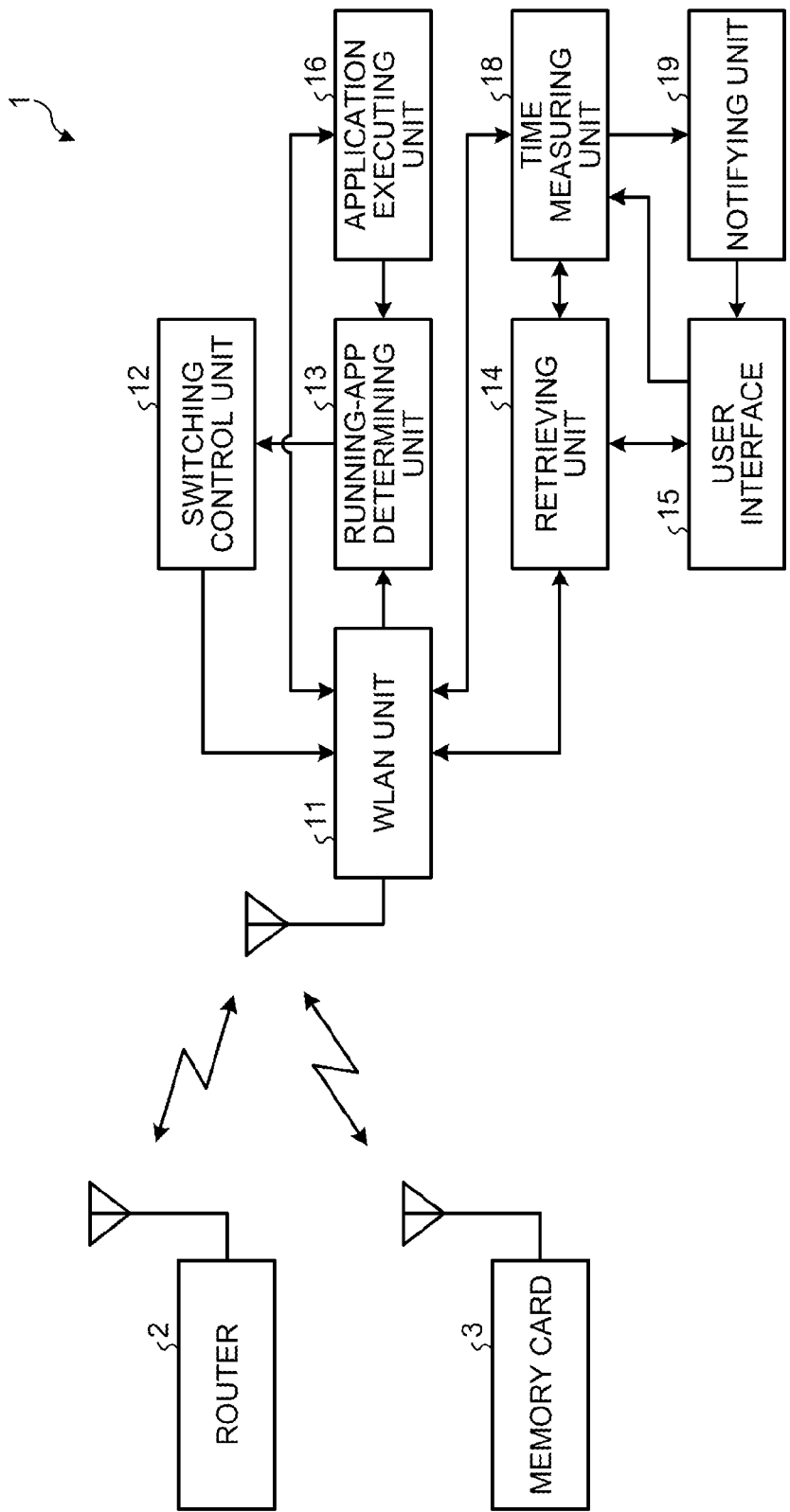
FIG. 5 is a block diagram of an information processing apparatus according to a third embodiment.

FIG. 5 is a block diagram of an information processing apparatus according to a third embodiment. Even when the information processing apparatus according to the present embodiment has become unable to detect a memory card during content retrieval, upon detection of the memory card later, the information processing apparatus continues the content retrieval. The information processing apparatus in the present embodiment is designed to maintain the continuity of content retrieval.

A PC 1 according to the present embodiment includes the WLAN unit 11, the switching control unit 12, the running-app determining unit 13, the retrieving unit 14, the user interface 15, the application executing unit 16, a time measuring unit 18, and a notifying unit 19. Description of the same function of a unit as in the first embodiment is omitted.

The WLAN unit 11 notifies the time measuring unit 18 of detection of the memory card 3. Furthermore, when the detected memory card 3 has become undetectable, the WLAN unit 11 notifies the time measuring unit 18 that the memory card 3 has not been detected.

Moreover, when having received a notification of time-out of the memory card 3 from the time measuring unit 18, the WLAN unit 11 disconnects from the memory card 3. At this time, when the WLAN unit 11 was connected to the router 2 before the connection with the memory card 3, the WLAN unit 11 re-establishes a connection with the router 2. Also, when having received a notification that the memory card 3 has not been detected during the count-up to the time-out from the time measuring unit 18, the WLAN unit 11 disconnects from the memory card 3. At this time, when the WLAN unit 11 was connected to the router 2 before the connection with the memory card 3, the WLAN unit 11 re-establishes a connection with the router 2. Furthermore, when the content retrieval has been completed, the WLAN unit 11 receives a notification of the completion of the content retrieval from the retrieving unit 14. Also, in this case, the WLAN unit 11 disconnects from the memory card 3, and, when the WLAN unit 11 was connected to the router 2 before the connection with the memory card 3, re-establishes a connection with the router 2.

The time measuring unit 18 includes a timer. The time measuring unit 18 has stored therein a time-out period of the memory card 3 in a manner associated with an SSID of the memory card 3 in advance. In the present embodiment, responding to the operator input made through the user interface 15, the time measuring unit 18 has stored the time-out period of the memory card 3 as 10 minutes. Furthermore, the time measuring unit 18 has stored therein a disconnect grace time. In the present embodiment, the time measuring unit 18 has stored 1 minute as the disconnect grace time.

The time measuring unit 18 receives information about detection of the memory card 3 from the WLAN unit 11. Then, the time measuring unit 18 starts counting up to time-out of the memory card 3. Then, when the connection with the memory card 3 has timed out, the time measuring unit 18 notifies the WLAN unit 11 and the notifying unit 19 of the time-out of the memory card 3. Furthermore, when having received a notification that the memory card 3 has not been detected during the count-up to the time-out from the WLAN unit 11, the time measuring unit 18 notifies the WLAN unit 11 and the notifying unit 19 that the memory card 3 has not been detected before the time-out of the memory card 3.

Furthermore, the time measuring unit 18 receives a notification of completion of retrieval from the retrieving unit 14. Then, in a case of automatic retrieval, the time measuring unit 18 activates the disconnect timer. After that, when having counted up to the disconnect grace time, the time measuring unit 18 notifies the retrieving unit 14 and the notifying unit 19 that the disconnect time has come. Furthermore, in a case of manual retrieval, when having received a notification of completion of retrieval from the retrieving unit 14, the time measuring unit 18 notifies the notifying unit 19 of completion of retrieval.

In a case where automatic retrieval has been set, once the WLAN unit 11 is connected to the memory card 3, the retrieving unit 14 starts automatic retrieval. Furthermore, in a case where manual retrieval has been set, the retrieving unit 14 displays "retrieve all" or "retrieve selectively" on the user interface 15 so that the operator can make a choice. Then, responding to an operator's choice made through the user interface 15, the retrieving unit 14 starts content retrieval from the memory card 3 by a specified retrieving method.

When the content retrieval from the memory card 3 has been completed, the retrieving unit 14 notifies the time measuring unit 18 of the completion of the retrieval. Then, in the case of automatic retrieval, until the retrieving unit 14 has received a notification of the coming of the disconnect time from the time measuring unit 18, the retrieving unit 14 continues the content retrieval and also retrieves content added in that time. Consequently, for example, when the memory card 3 is attached to a camera, and automatic retrieval is performed while the camera is taking pictures, the retrieving unit 14 can retrieve a newly-taken picture or the like during the disconnect grace time. When the retrieving unit 14 has received a notification of the coming of the disconnect time from the time measuring unit 18, the retrieving unit 14 terminates the content retrieval, and notifies the WLAN unit 11 of the termination of the content retrieval.

Furthermore, in the case of manual retrieval, after notifying the time measuring unit 18 of completion of the retrieval, the retrieving unit 14 terminates the content retrieval from the memory card 3.

Moreover, when the memory card 3 has become undetectable during the content retrieval from the memory card 3, the retrieving unit 14 saves retrieved contents and stores information about what extent the retrieval has been completed in a manner associated with an SSID of the memory card 3. Then, after that, when the WLAN unit 11 is again connected to the memory card 3, the retrieving unit 14 restarts the content retrieval from content next to the last retrieved content, thereby continuing the retrieval.

Furthermore, when the connection with the memory card 3 has timed out during the content retrieval from the memory card 3, the retrieving unit 14 saves retrieved contents and stores information about what extent the retrieval has been completed in a manner associated with an SSID of the memory card 3. Then, after that, when the WLAN unit 11 is again connected to the memory card 3, the retrieving unit 14 restarts the content retrieval from content next to the last retrieved content, thereby continuing the retrieval.

When the notifying unit 19 has received a notification that the memory card 3 has become undetectable before the time-out of the memory card 3 from the time measuring unit 18 during the content retrieval from the memory card 3, the notifying unit 19 displays a setting change recommendation notification on the user interface 15. For example, the notifying unit 19 displays a message of "An access point of the memory card is unable to be detected. Please set the time of power-saving setting in a device into which the memory card has been inserted to a longer time." Consequently, the operator can recognize that it is preferable to change the setting of the device into which the memory card 3 has been inserted.

Furthermore, when having received a notification of the time-out from the time measuring unit 18 during the content retrieval from the memory card 3, the notifying unit 19 displays a retrieval interruption message on the user interface 15. In the case of automatic retrieval, the message is, for example, "A photo of xxx/xxx has been retrieved. Due to the elapse of 10 minutes, an access point of the memory card has been closed. If you want to continue the retrieval, please again turn on the device into which the memory card has been inserted." Furthermore, in the case of manual retrieval, the message is, for example, "Due to the elapse of 10 minutes, an access point of the memory card has been closed. If you again perform the manual retrieval, please turn on the device into which the memory card has been inserted." Consequently, the operator can recognize information on retrieved content and the operation for continuing the retrieval.

After completion of the content retrieval from the memory card 3, when having received a notification of the coming of the disconnect time or the completion of the retrieval from the time measuring unit 18, the notifying unit 19 displays a normal disconnection message on the user interface 15. The normal disconnection message is, for example, "The connection to the memory card will be closed, and a connection with the router will be established." Consequently, the operator can recognize that the connection with the memory card 3 will be closed, and the connection with be switched to the router 2.

Figure 6:
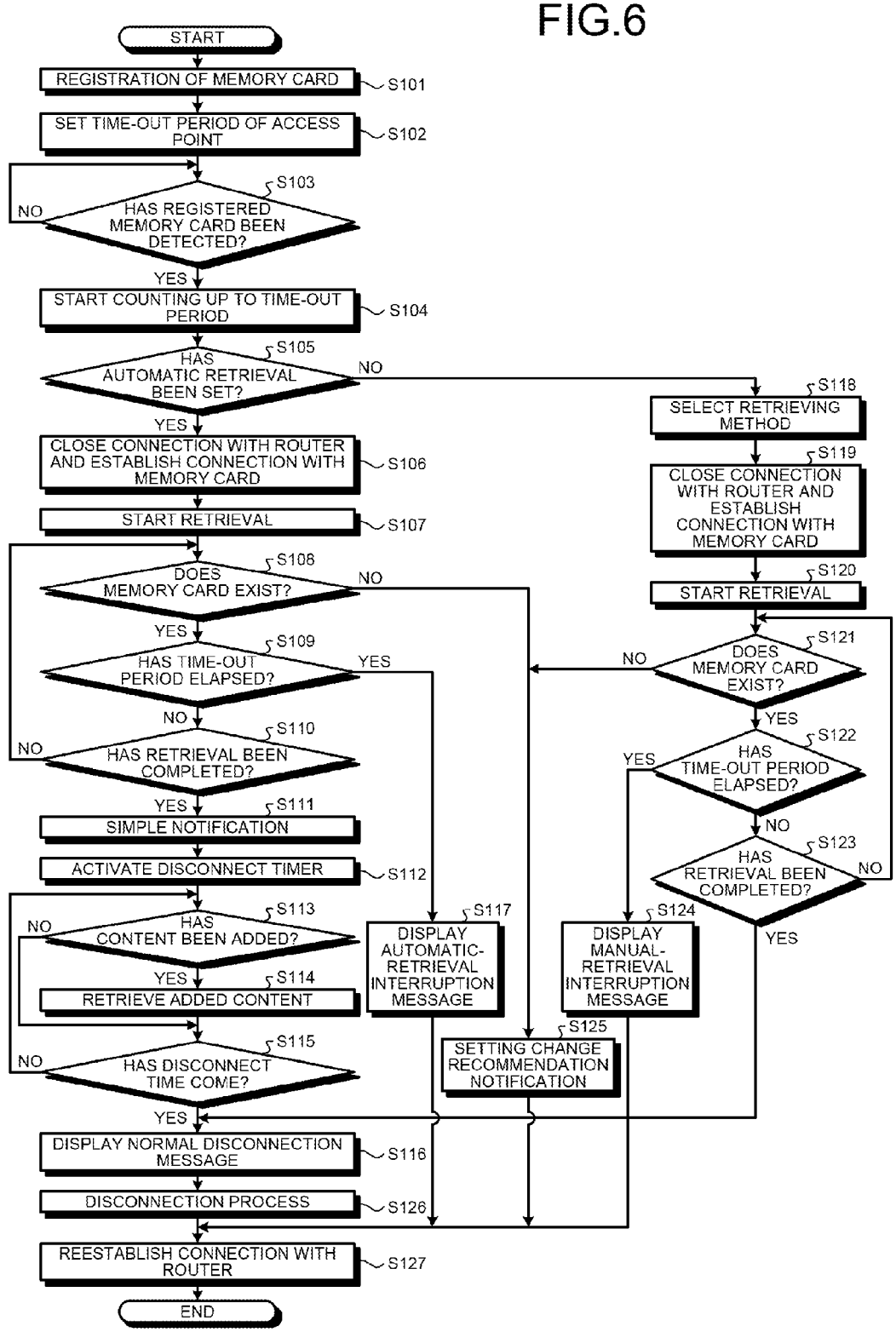
FIG. 6 is a flowchart of a content retrieving process performed by a PC according to the third embodiment.

Subsequently, the flow of a content retrieving process performed by the PC according to the present embodiment is explained with reference to FIG. 6. FIG. 6 is a flowchart of the content retrieving process performed by the PC according to the third embodiment. A communication control program stored in the PC 1 causes, for example, a CPU or the like of the PC 1 to execute processes in the flowchart illustrated in FIG. 6. It is based on the premise that prior to this flowchart, the WLAN unit 11 is connected to the router 2 and maintains this state.

The WLAN unit 11 accepts registration of the memory card 3 (Step S101). Then, the WLAN unit 11 transmits an SSID and time-out period of the memory card 3 to the time measuring unit 18. The time measuring unit 18 stores therein the time-out period in a manner associated with the SSID.

The operator sets a time-out period of an access point of the memory card 3 stored in the time measuring unit 18 through the user interface 15. Furthermore, the operator sets a time-out period of an access point of the memory card 3 by operating a device into which the memory card 3 has been inserted (Step S102). In the present embodiment, to conform to the operation form, a preset time-out period of an access point of the memory card 3 is changed; however, in a case of operation using the preset time-out period, it is not necessary to make the change.

The WLAN unit 11 determines whether the registered memory card 3 has been detected (Step S103). When the memory card 3 has not been detected (NO at Step S103), the WLAN unit 11 waits until the memory card 3 has been detected.

On the other hand, when the memory card 3 has been detected (YES at Step S103), upon receipt of a notification of the detection of the memory card 3 from the WLAN unit 11, the time measuring unit 18 starts counting up to the time-out period of the memory card 3 (Step S104).

The retrieving unit 14 determines whether automatic retrieval has been set as setting of retrieval (Step S105). When automatic retrieval has been set (YES at Step S105), the WLAN unit 11 disconnects from the router 2 and establishes a connection with the memory card 3 (Step S106).

The retrieving unit 14 starts content retrieval from the memory card 3 (Step S107).

The WLAN unit 11 determines whether the memory card 3 exists (Step S108). What the memory card 3 exists here means the WLAN unit 11 has been detecting the memory card 3. When the memory card 3 does not exist (NO at Step S108), the WLAN unit 11 notifies the time measuring unit 18 that the memory card 3 has not been detected, and moves the process to Step S125. On the other hand, when the memory card 3 exists (YES at Step S108), the time measuring unit 18 determines whether the time-out period of the memory card 3 has elapsed (Step S109). When the time-out period has not elapsed, the retrieving unit 14 determines whether the content retrieval from the memory card 3 has been completed (Step S110). When the content retrieval has not been completed (NO at Step S110), the retrieving unit 14 returns the process to Step S108.

On the other hand, when the content retrieval has been completed (YES at Step S110), the retrieving unit 14 displays a simple notification of the completion of the retrieval on the user interface 15 (Step S111).

Then, the retrieving unit 14 notifies the time measuring unit 18 of the completion of the retrieval. When having received the notification of the completion of the retrieval, the time measuring unit 18 activates the disconnect timer (Step S112).

The retrieving unit 14 determines whether content has been added to the memory card 3 while the disconnect timer is running (Step S113). When there is no content added, the PC 1 moves the process to Step S115. On the other hand, when there is content added, the retrieving unit 14 retrieves the added content (Step S114).

Then, the time measuring unit 18 determines whether the disconnect time has come (Step S115). When the disconnect time has not come (NO at Step S115), the retrieving unit 14 returns the process to Step S113. On the other hand, when the disconnect time has come (YES at Step S115), the time measuring unit 18 notifies the retrieving unit 14 and the notifying unit 19 of the coming of the disconnect time. Upon receipt of the notification of the coming of the disconnect time, the retrieving unit 14 terminates the content retrieval. Then, upon receipt of the notification of the coming of the disconnect time, the notifying unit 19 displays a normal disconnection message on the user interface 15 (Step S116).

On the other hand, when the time-out period has elapsed during the retrieval (YES at Step S109), the time measuring unit 18 notifies the WLAN unit 11 and the notifying unit 19 of the coming of the time-out period. The notifying unit 19 displays an automatic-retrieval interruption message on the user interface 15 (Step S117).

On the other hand, when not automatic retrieval but manual retrieval has been set (NO at Step S105), the retrieving unit 14 displays the retrieving-method selection screen on the user interface 15. Then, the operator selects a retrieving method through the user interface 15 (Step S118).

The WLAN unit 11 disconnects from the router 2 and establishes a connection with the memory card 3 (Step S119).

The retrieving unit 14 starts content retrieval from the memory card 3 (Step S120).

The WLAN unit 11 determines whether the memory card 3 exists (Step S121). When the memory card 3 does not exist (NO at Step S121), the WLAN unit 11 notifies the time measuring unit 18 that the memory card 3 has not been detected, and moves the process to Step S125. On the other hand, when the memory card 3 exists (YES at Step S121), the time measuring unit 18 determines whether the time-out period of the memory card 3 has elapsed (Step S122). When the time-out period has not elapsed, the retrieving unit 14 determines whether the content retrieval from the memory card 3 has been completed (Step S123). When the content retrieval has not been completed (NO at Step S123), the retrieving unit 14 returns the process to Step S121.

On the other hand, when the content retrieval has been completed (YES at Step S123), upon receipt of a notification of the completion of the content retrieval, the notifying unit 19 moves the process to Step S116.

On the other hand, when the time-out period has elapsed during the retrieval (YES at Step S122), the time measuring unit 18 notifies the WLAN unit 11 and the notifying unit 19 of the coming of the time-out period. The notifying unit 19 displays a manual-retrieval interruption message on the user interface 15 (Step S124).

Furthermore, when the memory card becomes non-existent during the content retrieval (NO at Step S108 and NO at Step S121), the time measuring unit 18 notifies the notifying unit 19 that the memory card has not been detected. The notifying unit 19 displays a setting change recommendation notification, which promotes a change in the setting of the device into which the memory card has been inserted, on the user interface 15 (Step S125).

When the memory card 3 becomes non-existent, when the disconnect time has come, or when the time-out period of the memory card 3 has come during the retrieval, the WLAN unit 11 performs a disconnection process of closing the connection with the memory card 3 (Step S126).

Then, the WLAN unit 11 reestablishes a connection with the router 2 to which the WLAN unit 11 was connected before the connection to the memory card 3 (Step S127).

As described above, when a connection with a memory card has been closed during content retrieval from the memory card, and a connection with the memory card is reestablished later, the information processing apparatus according to the present embodiment continues the retrieving process performed before the disconnection. Consequently, the continuity of content retrieval can be maintained. This makes it possible to avoid duplicate retrieval, reduce the load on the information processing apparatus, shorten the connect time, and reduce power consumption.

Hardware Configuration

Figure 7:
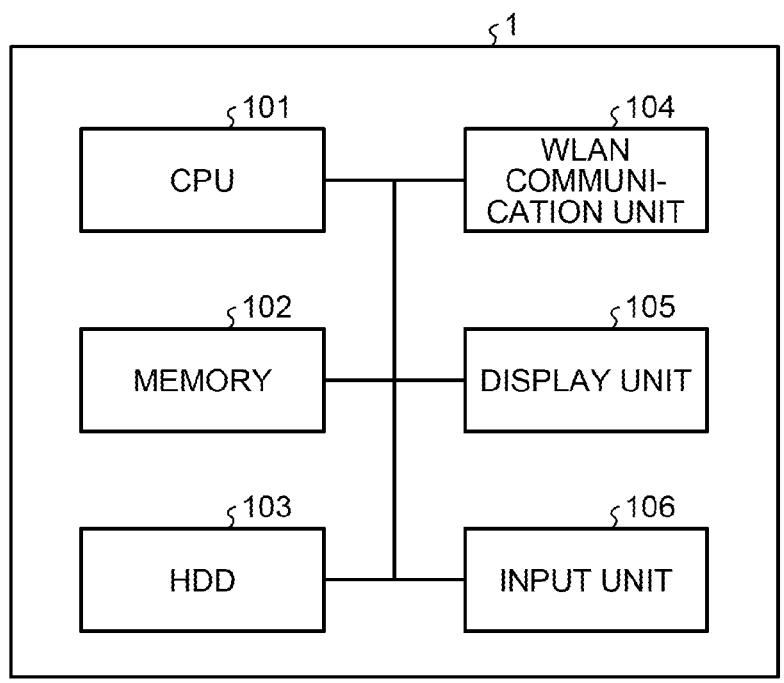
FIG. 7 is a hardware configuration diagram of the PC according to the embodiments.

FIG. 7 is a hardware configuration diagram of the PC according to the embodiments. The PC 1 includes a CPU 101, a memory 102, a hard disk drive (HDD) 103, a WLAN communication unit 104, a display unit 105, and an input unit 106.

The memory 102, the HDD 103, the WLAN communication unit 104, the display unit 105, and the input unit 106 are connected to the CPU 101 by a bus.

The display unit 105 is a monitor or the like. The input unit 106 is a keyboard and a mouse, etc. The display unit 105 and the input unit 106 perform, for example, the function of the user interface illustrated in FIG. 1.

The WLAN communication unit 104 and the CPU 101 perform, for example, the function of the WLAN unit 11 illustrated in FIG. 1.

The CPU 101, the memory 102, and the HDD 103 perform the functions of the switching control unit 12, the running-app determining unit 13, the retrieving unit 14, and the application executing unit 16 illustrated in FIG. 1, the time determining unit 17 illustrated in FIG. 3, and the time measuring unit 18 and the notifying unit 19 illustrated in FIG. 5.

Specifically, the HDD 103 stores therein various programs, such as programs that realize the processes performed by the switching control unit 12, the running-app determining unit 13, the retrieving unit 14, the application executing unit 16, the time measuring unit 18, and the notifying unit 19, etc. Then, the CPU 101 reads out these programs from the HDD 103, expands the read programs into the memory 102 and the like, and executes the programs, thereby generating processes that perform the above-mentioned functions. Furthermore, retrieved contents and the like are stored in the HDD 103.

Figure 8:
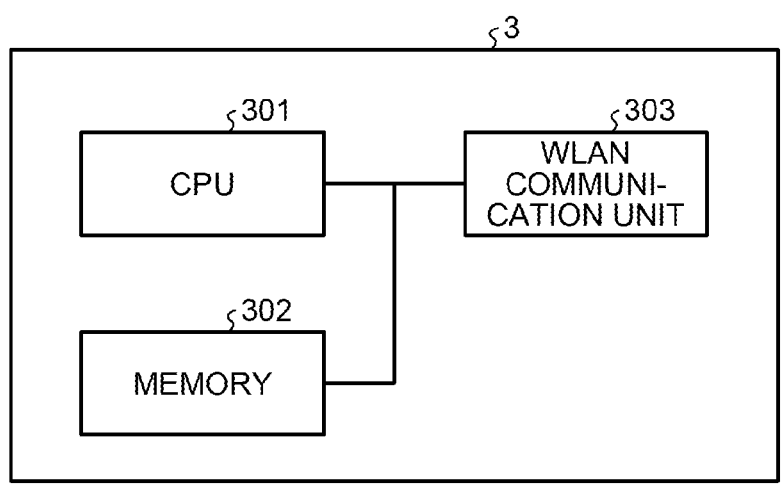
FIG. 8 is a hardware configuration diagram of the memory card according to the embodiments.

FIG. 8 is a hardware configuration diagram of the memory card according to the embodiments. The memory card 3 includes a CPU 301, a memory 302, and a WLAN communication unit 303.

The memory 302 and the WLAN communication unit 303 are connected to the CPU 301 by a bus.

The function of WLAN communication for communicating with the PC 1 is performed by the CPU 301, the memory 302, and the WLAN communication unit 303. The memory 302 stores therein an SSID, a password, and a time-out period, etc.

According to one aspect of the communication-path control program and information processing apparatus discussed herein, it is possible to maintain the continuity of communication connection.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a communication-path control program causing a computer to execute a process comprising:
   detecting a connecting device that is in a state to perform communication, the connecting device being an access point to connect to a network and a storage medium that performs wireless communication;
   when having detected the connecting device, connecting to the connecting device;
   when having detected the storage medium in a state where the computer is connected to the connecting device, determining whether a network-using application is running on the computer; and
   when the network-using application is not running, disconnecting from the connecting device and connecting to the storage medium.

2. The non-transitory computer-readable recording medium according to claim 1, wherein the process further comprises:
   when the storage medium has been detected and a predetermined time has elapsed since the last time the computer was connected to the storage medium, connecting to the storage medium.

3. The non-transitory computer-readable recording medium according to claim 1, wherein the process further comprises:
   when the storage medium has been detected and a predetermined time has not elapsed since the last time the computer was connected to the storage medium, asking an operator whether or not to connect to the storage medium.

4. The non-transitory computer-readable recording medium according to claim 1, wherein the process further comprises:
   connecting to the detected storage medium and retrieving data stored in the storage medium;
   when having become unable to detect the storage medium while the computer is retrieving data from the storage medium, saving data which has been retrieved till when the storage medium has become undetectable; and
   when having again detected the undetectable storage medium, connecting to the storage medium and restarting retrieving not-yet-retrieved data.

5. The non-transitory computer-readable recording medium according to claim 4, wherein the process further comprises:
   when having become unable to detect the storage medium within a connect time limit of the storage medium since the computer has been connected to the storage medium, notifying of recommendation to change power setting of the storage medium.

6. The non-transitory computer-readable recording medium according to claim 1, wherein the process further comprises:
   when having become unable to detect the storage medium within a connect time limit of the storage medium since the computer has been connected to the storage medium, notifying of non-completion of retrieval.

7. An information processing apparatus comprising:
   a communication unit that detects a connecting device that is in a state to perform communication, the connecting device being an access point to connect to a network and a storage medium which performs wireless communication, and connects to the detected connecting device and establishes communication with the detected connecting device;
   an application executing unit that executes an application;
   a determining unit that determines, when the storage medium has been detected in a state where the communication unit is connected to the connecting device, whether the application executing unit is executing a network-using application; and
   a control unit that controls the communication unit, when the application executing unit is executing the network-using application, to disconnect from the connecting device and connect to the storage medium.

* * * * *